(12) United States Patent
Okuyama et al.

(10) Patent No.: US 6,509,108 B2
(45) Date of Patent: Jan. 21, 2003

(54) MAGNETIC RECORDING MEDIUM AND A MAGNETIC DISC APPARATUS, WITH A CRP OR CRMOP REINFORCING COAT LAYER

(75) Inventors: Chiaki Okuyama, Higashine (JP); Yuki Yoshida, Kawasaki (JP); Kenji Sato, Kawasaki (JP); Kiyoshi Yamaguchi, Higashine (JP); Yoshita Kitamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/812,187

(22) Filed: Mar. 19, 2001

(65) Prior Publication Data

US 2001/0030829 A1 Oct. 18, 2001

Related U.S. Application Data

(63) Continuation of application No. PCT/JP98/05033, filed on Nov. 9, 1998.

(51) Int. Cl.⁷ .............................................. G11B 5/738
(52) U.S. Cl. ................. 428/661; 428/664; 428/666; 428/667; 428/680; 428/65.3; 428/65.7; 428/65.5; 428/141; 428/156; 428/336; 428/409; 428/694 TS; 428/694 TR; 428/694 SG; 428/163; 204/192.2; 360/135
(58) Field of Search .................. 428/694 TS, 694 TC, 428/694 TR, 611, 650, 663, 65.3, 65.7, 141, 332, 664, 666, 163, 409, 900, 694 SG, 661, 336, 156, 65.5, 667, 680; 360/135; 204/192.2

(56) References Cited

U.S. PATENT DOCUMENTS 5,480,733 A * 1/1996 Okumura et al. ........ 428/694 T
5,650,889 A * 7/1997 Yamamoto et al. ...... 360/97.01

FOREIGN PATENT DOCUMENTS

| JP | 64-19525 | 1/1989 |
| JP | 8-77552 | 3/1996 |
| JP | 8-115516 | 5/1996 |
| JP | 9-97417 | 4/1997 |
| JP | 10334445 | 12/1998 |

OTHER PUBLICATIONS

English Translation of JP 09–097417 A (Document heading PTO 02–17).*
English Translation of JP 08–115516 A (Document heading PTO 2001–4349).*

* cited by examiner

Primary Examiner—Paul Thibodeau
Assistant Examiner—Kevin M. Bernatz
(74) Attorney, Agent, or Firm—Greer, Burns & Crain, Ltd.

(57) ABSTRACT

A magnetic recording medium has a nonmagnetic substrate having applied thereon through a nonmagnetic underlayer a magnetic recording layer composed of a magnetic metal material. The nonmagnetic substrate has a smooth surface with an average surface roughness Ra of not more than 20 Å, a recesses-and protrusions-forming layer having stripe-like protrusions and recesses in the circumferential direction, formed on the substrate. A CrP or CrMoP reinforcing coat layer having a hardness higher than that of the recesses-and protrusions-forming layer is sandwiched between the substrate and the recesses-and-protrusions-forming layer.

13 Claims, 6 Drawing Sheets

RECORDING GAP

MAGNETIC RECORDING MEDIUM AND A MAGNETIC DISC APPARATUS, WITH A CRP OR CRMOP REINFORCING COAT LAYER

CROSS REFERENCE TO RELATED APPLICATIONS

This application is a continuation application of International application No. PCT/JP98/05033, filed on Nov. 9, 1998, and not published in English.

TECHNICAL FIELD

The present invention relates to a magnetic recording medium. More particularly, the present invention relates to a magnetic recording medium which is particularly used in a magnetic disc apparatus equipped with a flying type magnetic head, which is excellent in a characteristic of friction sliding with a magnetic head, which can improve a reproducing output and a signal-to-noise (S/N) ratio by keeping the low noise of the magnetic recording medium without any change, and which hardly produces bit errors. The present invention also relates to a magnetic disc apparatus in which such a magnetic recording medium is used and which records and reproduces information.

BACKGROUND ART

High-density assembly of a magnetic disc apparatus used as a computer external memory has come to be highly required with the development of information processing technologies. In order to meet the requirements, as is well known, a CSS (contact-stop-and-start) system wherein a magnetic head is contacted with a magnetic recording medium when the magnetic recording medium stops, the magnetic head slides on the medium in the initial stage of starting, the magnetic head then departs from the medium and floats, and the head then flies while maintaining a constant flying distance, has widely been adopted in currently used magnetic disc apparatuses.

Magnetic disc apparatuses based on the CSS system have been variously improved. Specifically, in a reproducing head part of a magnetic disc apparatus, a magnetoresistance effect type head in which a magnetoresistance element changing its resistance in accordance with the intensity of the magnetic field is used, namely, an MR head has been used, in place of a conventional winding type inductive thin film magnetic head. The MR head uses the magnetoresistance effect, that is a change in the resistance of the magnetic material caused by application of an external magnetic field, in the reproduction of signals on a recording medium, and is characterized by the following advantages: a reproducing output amplitude several times as much as that of a conventional inductive thin film magnetic head can be obtained; the inductance is small; and a large S/N ratio can be expected. Moreover, in addition to the MR head, users have begun to use an AMR head utilizing an anisotropic magnetoresistance effect, a GMR head utilizing a giant magnetoresistance effect and a spin bubble type GMR head that is a practical type of GMR head. Note that these magnetoresistance effect type heads are generically referred to as "MR heads, etc." in the present specification.

Furthermore, a magnetic recording medium to be used in the magnetic disc apparatus is also required to have improved characteristics corresponding to those of the MR head, etc. That is, a magnetic recording medium is required to have an excellent CSS resistance, have a high coercive force (Hc) and have a low noise.

A conventional magnetic recording medium usually has a layer construction as shown by the cross-sectional view in FIG. 1. That is, a magnetic recording medium 110 comprises a nonmagnetic substrate 101 of aluminum or its alloy, having applied thereon a magnetic recording layer 105 of an alloy that contains cobalt as its major component. Moreover, a nonmagnetic underlayer 104 of chromium or its alloy is sandwiched between the substrate 101 and the magnetic recording layer 105. The nonmagnetic underlayer 104 is aimed at making the direction of easy magnetization of the magnetic recording layer locate in a film plane of the magnetic recording layer. Furthermore, when the substrate 101 is composed of aluminum or its alloy, an electroless Ni—P plating layer 103 is applied to improve the adhesion of the Cr-based underlayer 104 to the substrate 101. A protective layer 106 of carbon or the like is formed on the surface of the magnetic recording layer 105 to protect the medium 110. A lubricating layer (not shown) is generally applied to the protective layer 106.

As explained above, an electroless Ni—P plating layer is ordinarily formed on the substrate of aluminum or its alloy in a magnetic recording medium. The Ni—P plating layer is formed to lower the friction coefficient between the magnetic head and the magnetic recording medium in the magnetic disc apparatus in which the CSS system is adopted. Stripe-like grooves composed of protruded portions and recessed portions are formed on the surface of the Ni—P plating layer on the substrate in the circumferential direction. That is, as schematically shown in FIG. 2, grooves formed of fine protruded portions 3a and fine recessed portions 3b having shapes different from each other are formed on the surface of the electroless Ni—P plating layer 103 on the substrate 101. The treatment for forming the recessed and protruded portions is generally referred to as "texture processing" or "texturing". Texture processing is conducted by pressing grinding abrasive grains or the like to a surface of the rotating substrate to mechanically produce grooves in the circumferential direction or by similar procedures. Moreover, as is well known, the treatment is also aimed at further directing the direction of easy magnetization in the magnetic recording layer to the circumferential direction so that the treatment contributes to the improvement of a S/N ratio.

As of now, the most commonly employed method as the texturing processing is the mechanical texture processing wherein, as explained above, grinding abrasives or the like are pressed to an aluminum substrate plated with Ni—P or others to form grooves. However, since the aluminum used as a substrate and the Ni—P plating layer formed thereon to improve the CSS resistance are relatively soft materials, deep grooves of about 15 to 20 nm depth may be partially formed when grinding abrasive grains or the like are pressed in the processing method. Since a signal output is decreased in such deep groove portions, bit errors are produced.

Recently, since magnetic disc apparatuses have been used for portable applications, glass or ceramic substrates have been used in place of aluminum substrates or the like in order to increase the impact resistance. However, the conventional mechanical texture processing causes the following problems: when a material having no brittleness and having a high hardness such as glass or ceramics is used, accurate and controlled formation of grooves in the circumferential direction cannot be performed; moreover, the processing deteriorates the anisotropy of the axis of easy magnetization in the circumferential direction to lower the S/N ratio. Methods of forming recesses and protrusions without using the mechanical texture processing include a method of chemically etching the surface of a glass substrate, as disclosed in, for example, Japanese Unexamined Patent Publication (Kokai) Nos. 60-136035, 63-225919, etc. However, even this chemical processing method cannot make the magnetic material have anisotropic properties of the axis of easy magnetization in the circumferential direction, and thus there still remains the problem that the S/N ratio is lowered.

DISCLOSURE OF THE INVENTION

An object of the present invention is to solve the above-described prior art problems, thus providing a magnetic recording medium capable of conducting high density recording, in which various nonmagnetic materials including glass and ceramics which are particularly excellent in impact resistance, can be used as a substrate, on which fine recessed and protruded grooves having a high friction sliding characteristic can be formed while the anisotropy of an axis of easy magnetization in the circumferential direction, leading to a low noise and a high S/N ratio, is maintained, and on which formation of deep grooves reaching the substrate surface can be prevented during the formation of the grooves, thereby enabling removal of bit errors.

Another object of the present invention is to provide a magnetic recording medium which can be particularly advantageously used in a magnetic disc apparatus equipped with a flying-type magnetic head.

Furthermore, another object of the present invention is to provide a magnetic disc apparatus in which the magnetic recording medium according to the present invention is used.

The above objects and other objects of the present invention will be easily understood from the following detailed description of the present invention.

As a result of intensively carrying out investigations to achieve the above objects, the present inventors have found that when fine recessed and protruded grooves are to be formed on a nonmagnetic substrate having a smooth surface, if a relatively hard reinforcing coat layer (also referred to as "a precoat layer" in the present specification) is inserted between the substrate and a soft, recesses-and protrusions-forming layer on the substrate, it becomes possible to provide a magnetic recording medium on which fine recessed and protruded grooves for improving the friction sliding characteristic between a magnetic head and the medium can be formed while the anisotropic properties of the axis of easy magnetization in the circumferential direction are being kept; moreover, formation of deep grooves is suppressed so that generation of bit errors can be prevented.

The present invention provides, in one aspect thereof, a magnetic recording medium comprising a nonmagnetic substrate having applied thereon, through a nonmagnetic underlayer, a magnetic recording layer composed of a magnetic metal material, characterized in that the nonmagnetic substrate comprises a substrate having a smooth surface with an average surface roughness Ra of not more than 20 Å, a recesses-and protrusions-forming layer having stripe-like protrusions and recesses in the circumferential direction, formed on the substrate, and a reinforcing coat layer having a hardness higher than that of the recesses-and protrusions-forming film is sandwiched between the substrate and the recesses-and protrusions-forming layer.

It is particularly preferred to use the magnetic recording medium of the present invention in a magnetic disc apparatus equipped with a flying-type magnetic head.

Furthermore, the present invention provides, in another aspect thereof, a magnetic disc apparatus equipped with a recording head part for recording information and a reproducing head part for reproducing information in a magnetic recording medium, characterized in that the magnetic recording medium is the one according to the present invention that is described above and will be explained below in detail, and that the reproducing head part is equipped with a magnetoresistance-effect-type head.

The magnetoresistance-effect-type head used in the magnetic disc apparatus of the present invention is preferably an MR head, an AMR head or a GMR head (including a spindle type GMR head).

BEST MODE FOR CARRYING OUT THE INVENTION

The magnetic recording medium according to the present invention comprises a nonmagnetic substrate, a nonmagnetic underlayer and a magnetic recording layer, composed of a magnetic metal material, with the magnetic recording layer formed on the substrate through the underlayer. In the magnetic recording medium, the nonmagnetic substrate has a smooth surface, that is, the substrate has a surface that is not texture processed. The surface smoothness of the substrate is not more than 20 Å as defined by an average surface roughness Ra (also termed "a center line average roughness"), which is described in "Metrogy and Properties of Surfaces" in Technological Committee TC 57 of ISO. Moreover, the following two precoat layers are successively formed on the smooth surface of the substrate:

(1) a reinforcing coat layer having a hardness higher than that of the recesses-and protrusions-forming layer to be laminated thereon, and (2) a recesses-and protrusions-forming layer formed on the reinforcing coat layer, which has grooves composed of stripe-like protrusions and recesses extended in the circumferential direction. The magnetic recording medium of the present invention can be widely modified or improved, insofar as the above requirements for the layer construction are satisfied along with the expected effects.

Figure 1:
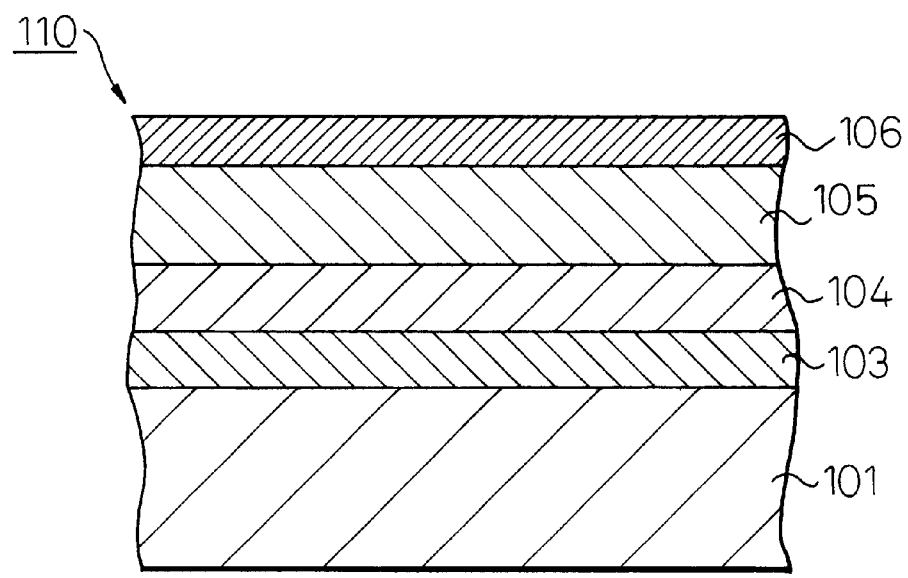
FIG. 1 is a cross-sectional view showing one embodiment of the conventional magnetic recording media.
Figure 2:
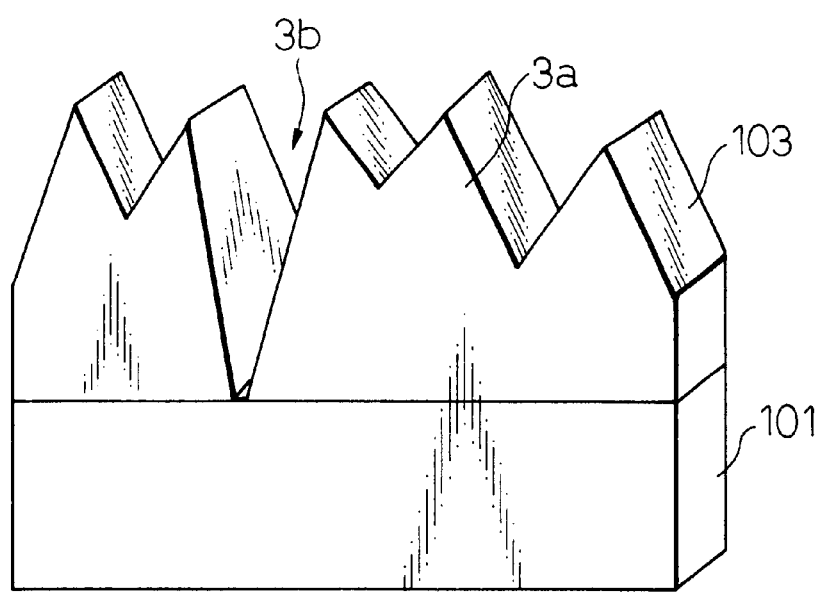
FIG. 2 is a schematic view illustrating a layer construction near the substrate of the magnetic recording medium shown in FIG. 1.
Figure 3:
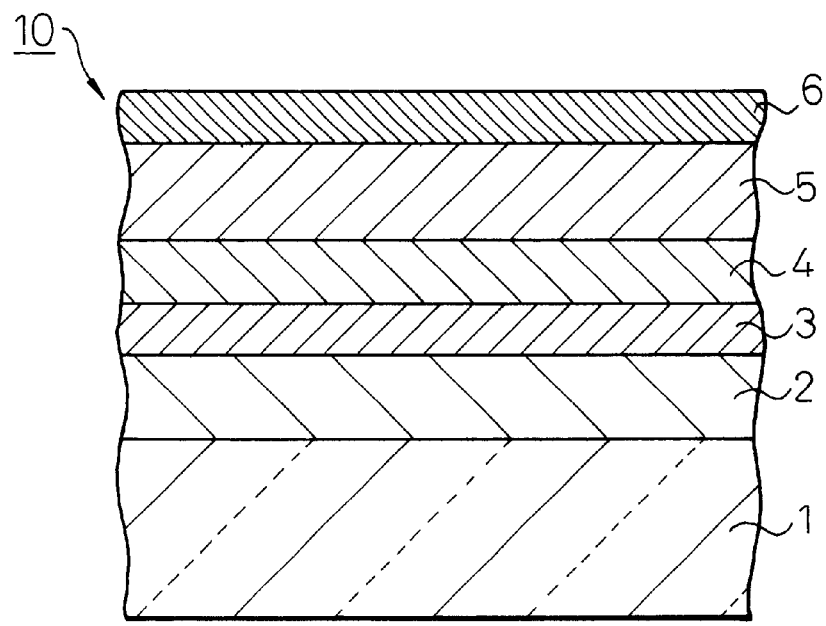
FIG. 3 is a cross-sectional view showing one preferred embodiment of the magnetic recording medium according to the present invention.

One preferred embodiment of the magnetic recording medium of the present invention is shown in FIG. 3 as a cross-sectional view. That is, a magnetic recording medium 10 can be formed by providing on a nonmagnetic substrate 1 (e.g., a glass substrate) through a nonmagnetic underlayer 4 (e.g., a Cr—Mo alloy layer), a magnetic recording layer 5 composed of a magnetic metal material that has a direction of easy magnetization in the circumferential direction (e.g., a Co—Cr—Pt—Ta alloy layer). Moreover, a reinforcing coat layer 2 (e.g., a Cr—Mo—P alloy layer) and a recesses-and protrusions-forming layer 3 (e.g., an electroless Ni—P plating layer) are successively provided on the surface of the substrate 1. Furthermore, in the embodiment shown in FIG. 3, a carbon protective layer 6 is applied as a top layer as commonly conducted in this technical field. Each of the layers on the substrate 1 is formed by sputtering.

Figure 4:
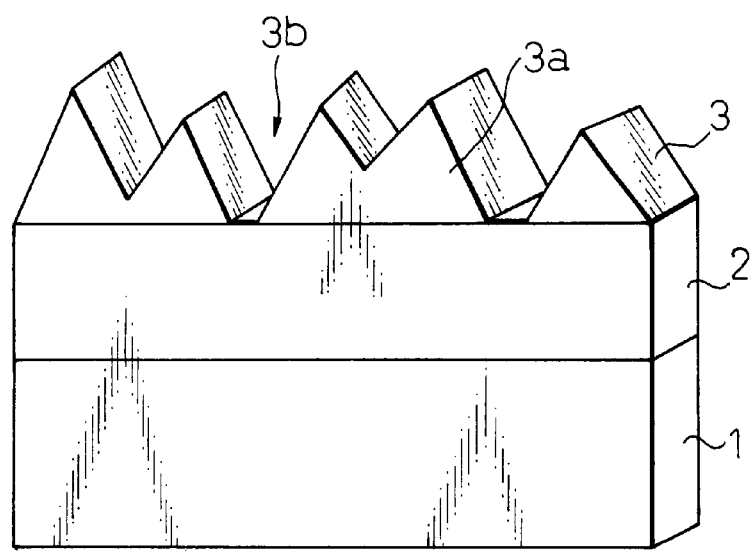
FIG. 4 is a schematic view illustrating a layer construction near the substrate of the magnetic recording medium shown in FIG. 3.
Figure 5:
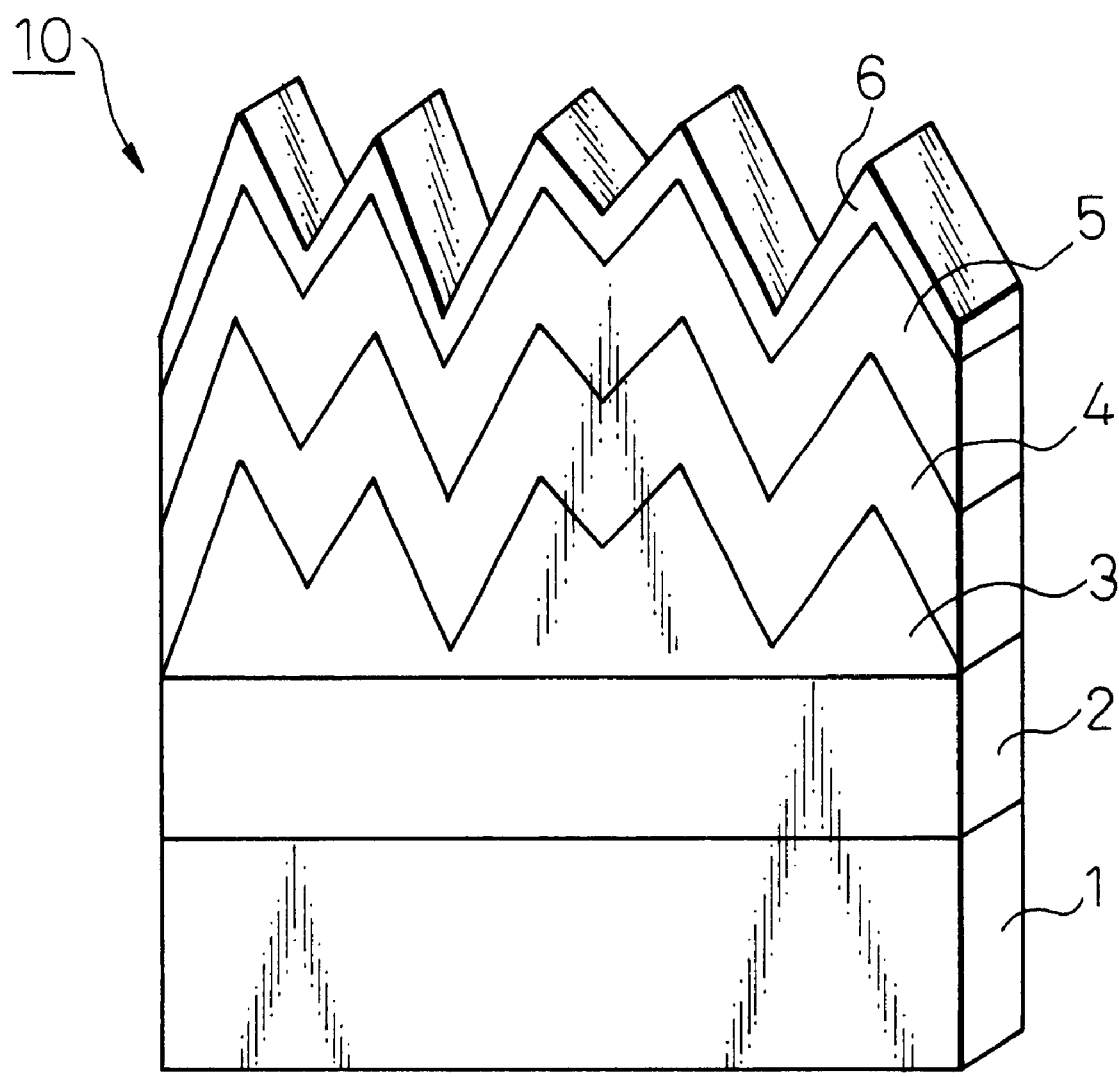
FIG. 5 is a schematic view illustrating the entire layer construction of the magnetic recording medium shown in FIG. 3.

As schematically shown in FIG. 4, the recesses-and-protrusions-forming layer 3 has fine grooves composed of stripe-like protrusions 3a and recesses 3b both extended in the circumferential direction. As shown in the figure, each of the grooves has a variously changed shape and the surface of the reinforcing coat layer 2 as an underlayer may be partly exposed. That is, the reinforcing coat layer 2 prevents formation of deep recessed portions. Moreover, the grooves of the recesses-and protrusions-forming layer 3 are similarly transferred to each of the layers formed thereon as shown in FIG. 5. As a result, desired effects such as improvement of a CSS resistance and a signal-to-noise (S/N) ratio of the medium can be ensured.

In the magnetic recording medium of the present invention, the nonmagnetic substrate used as a substrate can be produced using various nonmagnetic materials conventionally used in this technical field, and is preferably used in the form of disc. Examples of a suitable substrate material include aluminum or its alloys, glass, crystallized glass, carbon and silicon, although the material is not restricted to those mentioned above. In addition, in the practice of the present invention, in view of obtaining a high impact resistance or the like of the disc during carrying the same, it is preferred to use a glass substrate or a substrate having a hardness similar to that of the glass substrate. Accordingly, explanations will be made below with reference to embodiments in which the glass substrate is used.

The glass substrate used herein can be suitably selected from glass substrates conventionally used in this technical field. Examples of the suitable glass substrates include soda lime glass, aluminosilicate glass, alkali-free glass and the like as well as the above-mentioned crystallized glass, although the glass substrates are not restricted thereto.

The glass substrate is preferably used after cleaning the surface, although other substrates may be also used after such cleaning of the surface. The surface of the glass substrate can be cleaned by a conventional procedure. For example, a degreasing step using ultra-pure water, an alkali detergent, a neutral detergent or the like, a washing step using ion-exchanged water, and the other steps can be employed in combination. Activation treatment or the like of the substrate surface may optionally be conducted.

The nonmagnetic substrate used in the practice of the present invention has a smooth surface as explained above. That is, the substrate has an average surface roughness Ra of not more than 20 Å, and more preferably, of 10 Å or less. When the substrate has a rough surface and thus its Ra exceeds 20 Å, the surface roughness may adversely influence the effect, brought about by the precoat layer specific to the present invention, which will be explained below, and accordingly, it is desired to use a substrate having a surface as smooth as possible.

As explained above, the nonmagnetic substrate used in the magnetic recording medium of the present invention comprises two precoat layers: (1) a reinforcing coat layer composed of a material harder than a recesses-and protrusions-forming layer; and (2) the recesses-and protrusions-forming layer formed on the reinforcing coat layer.

As explained above, the reinforcing coat layer is used to avoid the disadvantage that the substrate surface is simultaneously etched off during the mechanical texture processing. The reinforcing coat layer is preferably formed from a material harder than the recesses-and protrusions-forming layer to be laminated thereon. A comparison of a film hardness between the reinforcing coat layer and the recesses-and protrusions-forming layer can be made by the procedure explained below. Each layer is deposited as a thin film of 100 nm thick on a glass substrate as the nonmagnetic substrate, and the film hardness is measured by the indentation microhardness testing method. In the practice of the present invention, a comparison of a layer hardness between the reinforcing coat layer and the recesses-and protrusions-forming layer is made, and the requirements for a film hardness can be met when the former layer is judged to be harder than the latter layer.

Figure 11:
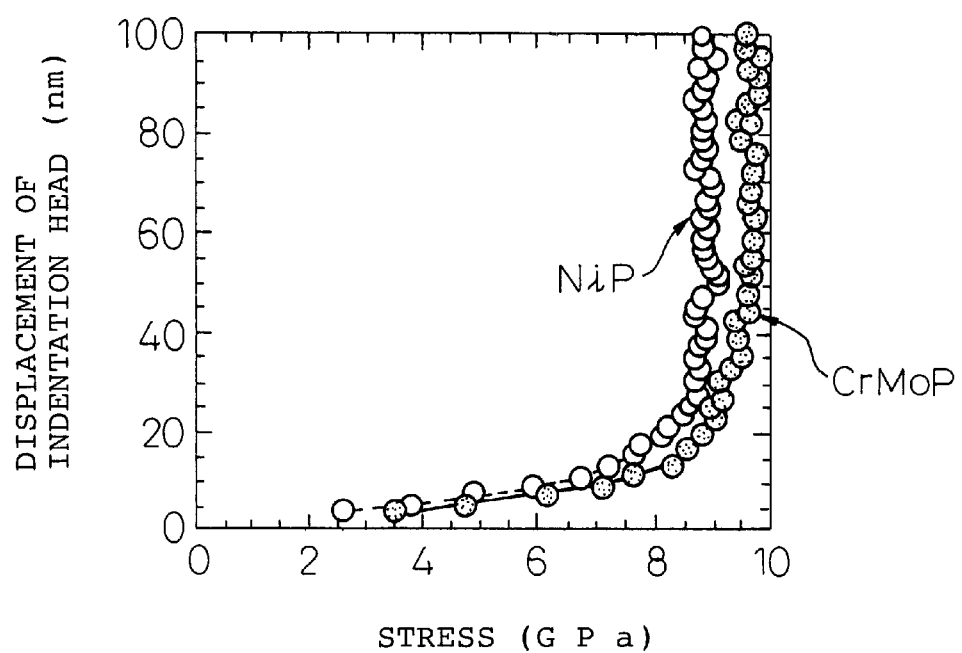
FIG. 11 is a graph showing the results obtained by comparing the film hardness of a Ni—P layer and that of a Cr—Mo—P layer.

The indentation microhardness test is conducted in the following manner. An indentation type thin film hardness meter, for example, "Nanoindentor-II (trade name of a thin film hardness meter, manufactured by Nano Instrument)" is used, and a Berkovich-shaped diamond indentation element (as an indentation head) is pressed into a thin film to be tested at an extremely slow speed to measure the indentation depth (a displacement, nm, of the indentation head). In the examples explained below, a maximum indentation load and an indentation speed were set at 4 mN and 0.3 nm/sec, respectively. The indentation test was carried out 10 times on each of the test films, and the film hardness (displacement, nm, of the indentation head) was determined from the average value of indentation. FIG. 11 which will be referred to in the applied examples shows that the reinforcing coat layer is excellent in film hardness in comparison with the recesses-and protrusions-forming layer.

The reinforcing coat layer that meets the requirements for the film hardness as explained above can be formed from various highly hard materials used in the field of a magnetic recording medium. However, in the practice of the present invention, it is preferred to consider the desired properties of the medium, and particularly to form the reinforcing coat layer from a thin film containing Cr as a major component, and P alone or Mo and P as additional component(s). When the reinforcing coat layer comprises a Cr—Mo—P ternary alloy, the ratio of the elements may be widely variable, however, the ratio generally falls into the following range: 10 to 98 at % of Cr; 0 to 50 at % of Mo; and 2 to 40 at % of P.

The reinforcing coat layer can preferably be formed by, for example, sputtering such as magnetron sputtering under conventional film-forming conditions. An example of suitable film-forming conditions is: a film-forming temperature of about 100 to 300° C.; an Ar gas pressure of about 1 to 10 mTorr; and a DC negative bias of about 100 to 300 V.

Moreover, other film-forming methods such as vacuum deposition and ion beam sputtering may also be optionally employed in place of sputtering.

Although the thickness of the reinforcing coat layer may be widely varied depending upon various factors, the thickness is preferably from 10 to 70 nm, more preferably from 15 to 30 nm. When the thickness of this underlayer is smaller than 10 nm, the underlayer may not function fully as a barrier protecting the substrate surface during texture processing of the recesses-and-protrusions-forming layer. On the contrary, when the thickness exceeds 70 nm, there is the possibility that a disadvantage such as an increase in noise is caused.

The recesses-and protrusions-forming layer used in combination with and on the reinforcing coat layer has grooves on its surface. The grooves are composed of stripe-like protrusions and recesses extended in the circumferential direction. It is therefore preferred that the layer is formed from a material that is capable of forming such grooves and that does not influence adversely the desired properties of the medium. Although various materials may be selected as ones for preparing a recesses-and-protrusions-forming layer, a nonmagnetic alloy of nickel (Ni) and phosphorus (P) can be advantageously used in the practice of the present invention. Although the proportion of each of the elements in a Ni—P alloy can be widely changed, the proportion is usually in the following range: 65 to 90 at % of Ni; and 10 to 35 at % of P.

The recesses-and protrusions-forming layer can be formed in the same manner as in the formation of the above reinforcing coat layer, preferably by sputtering such as magnetron sputtering under conventional film-forming conditions. An example of suitable film-forming conditions is as follows: a film-forming temperature of about 100 to 300° C.; an Ar gas pressure of about 1 to 10 mTorr; and a DC negative bias of about 100 to 300 V. Moreover, other film-forming methods such as vacuum deposition and ion beam sputtering may also be optionally employed in place of sputtering.

After formation of the recesses-and-protrusions-forming layer, fine grooves composed of stripe-like recesses and protrusions are formed on the surface thereof. The groove formation is preferably conducted by texture processing. Texture processing in a surface of the recesses-and protrusions-forming layer can be carried out by commonly employed procedures in the production of a magnetic recording medium, and it can be advantageously conducted by a mechanical procedure. Examples of suitable mechanical texture processing include surface grinding of a recesses-and protrusions-forming layer with grinding means such as a abrasive tape and loose abrasives.

Although the thickness of the recesses-and protrusions-forming layer can be varied in a wide range depending upon various factors, it must be of such a thickness that deep grooves producing bit errors are not formed. Moreover, since the texture processing partially etches off the film to a depth of about 10 nm (accordingly, the remaining thickness must be up to the depth of the grooves), the thickness is preferably from 10 to 30 nm.

In the magnetic recording medium of the present invention, the nonmagnetic underlayer sandwiched between the nonmagnetic substrate having thereon the reinforcing coat layer and the recesses-and-protrusions-forming layer, and the magnetic recording layer can be formed from a conventionally used underlayer in this technical field with or without optional modifications or improvements as in the formation of the substrate explained above. In general, the underlayer is preferably formed as a Cr-based underlayer from a thin film containing chromium (Cr) as a major component. The Cr-based underlayer may be used as a single layer, or alternatively, it may be used as a composite layer having two or more layers, as is often practiced in the field. When the underlayer is used as a composite layer, the underlayer may be formed as a laminate comprising underlayers of the same type, for example, Cr—Mo-based underlayers and a nonmagnetic intermediate layer allowed to intervene therebetween. Alternatively, the underlayer may be formed as a laminate of underlayers of different type, for example, a combination of a Cr—Mo-based underlayer and a Cr—P-based underlayer.

The Cr-based underlayer may usually be formed from Cr alone. Alternatively, it may be formed from an alloy of Cr and other metals, as is generally conducted in the technical field. Examples of a suitable Cr-based alloy include Cr—W, Cr—V, Cr—Ti and Cr—Mo. Of the alloys, Cr—Mo is particularly preferred. In particular, for the magnetic recording medium of the present invention, when the magnetic recording layer is allowed to contain platinum (Pt), the underlayer that is to be placed directly below the magnetic recording layer is preferably formed from a Cr—Mo alloy. This is because addition of Mo can widen the lattice spacing; moreover, when the lattice spacing of the underlayer is made close to the lattice spacing of the magnetic recording film that is widened by the composition, particularly by Pt of the recording film, the preferred orientation of the C-axis of the magnetic recording layer (Co—Cr-based alloy layer) in the plane can be promoted.

The Cr-based underlayer or the other nonmagnetic underlayers can preferably be formed by sputtering such as magnetron sputtering under conventional film-forming conditions. An example of suitable film-forming conditions is: a film-forming temperature of about 100 to 300° C.; an Ar gas pressure of about 1 to 10 mTorr; and a DC negative bias of about 100 to 300 V. Moreover, other film-forming methods such as vacuum deposition and ion beam sputtering may also be optionally employed in place of sputtering.

Although the thickness of a nonmagnetic underlayer can be varied in a wide range depending upon various factors, the thickness is preferably from 10 to 70 nm, more preferably from 15 to 30 nm. When the thickness of the underlayer is smaller than 10 nm, there is the possibility that the magnetic properties are not manifested sufficiently. Contrary to this, when the thickness exceeds 70 nm, noise tends to increase.

In the magnetic recording medium of the present invention, the magnetic recording layer can be formed from a magnetic metal material, preferably from an alloy containing cobalt as its major component such as a Co—Ni-based alloy and a Co—Cr-based alloy, as is commonly conducted in the technical field. Formation of the magnetic recording layer from a Co—Cr-based alloy is particularly preferred. Moreover, in addition to the formation of the magnetic recording layer from such a binary alloy, it is preferred to form the magnetic recording layer from a ternary, quaternary or quinary alloy prepared by optionally adding other elements such as platinum, tantalum, niobium, tungsten and carbon. Formation of the magnetic recording layer from a multicomponent alloy is rather advantageous in view of the resulting properties. According to the findings of the present inventors, the magnetic recording layer, which will be more specifically explained below, is preferably composed of a Co—Cr-based alloy, and the Cr content is preferably at least 17 at %.

Further, the magnetic recording layer may have a single layer structure. Alternatively, it may have a two layer structure or a multilayer structure having at least two layers. Furthermore, when the magnetic recording layer has a multilayered structure, a magnetic intermediate layer may also be inserted between the magnetic recording layers.

Furthermore, the magnetic recording layer used in the magnetic recording medium of the invention preferably has a direction of easy magnetization in the circumferential direction, contains chromium and platinum in addition to cobalt as its major component, and further tantalum or tantalum and niobium to form a quaternary or quinary alloy. The amount of chromium and platinum used in combination with the cobalt major component is: 17 to 25 at % of chromium; and 4 to 15 at % of platinum.

The quaternary alloy of the magnetic recording layer formed from the four elements: cobalt, chromium, platinum and tantalum preferably has a composition range expressed by the formula:

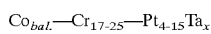

$$Co_{bal.}—Cr_{17-25}—Pt_{4-15}Ta_x$$

wherein bal. signifies a balancing amount, and x is from 1 to 5 at %.

Moreover, the quinary alloy of the magnetic recording layer formed from the five elements: cobalt, chromium, platinum, tantalum and niobium preferably has a composition range expressed by the formula:

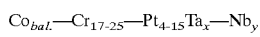

$$Co_{bal.}—Cr_{17-25}—Pt_{4-15}Ta_x—Nb_y$$

wherein bal. signifies a balancing amount, and x+y is from 1 to 5 at %. In this quinary alloy, the additional amounts of tantalum and niobium are preferably equal or approximately equal.

In the magnetic recording medium of the present invention, the magnetic recording layer preferably has tBr (product of a thickness t and a remnant magnetization density Br of the magnetic recording layer) of about 30 to 120 G$\mu$m regardless of the composition of the alloy, particularly regardless of whether the recording layer is formed from a quaternary alloy or a quinary alloy. Since the magnetic recording layer of the invention has a smaller thickness compared with the conventional magnetic recording layers, it is particularly suitable for use in magnetoresistance effect type heads such as an MR head.

As described above, the magnetic recording layer formed on a nonmagnetic substrate through a composite precoat layer and an underlayer specific to the present invention is preferably formed from a quaternary alloy such as a Co—Cr—Pt—Ta alloy or a quinary alloy such as a Co—Cr—Pt—Ta—Nb alloy as explained above. The magnetic recording layer can preferably be formed by sputtering under specific advantageous film-forming conditions. In order to increase the coercive force, it is particularly preferred to conduct sputtering under the application of a DC negative bias. Magnetron sputtering, for example, can be conducted as the sputtering method similarly to the formation of the precoat layer and the underlayer described above. An example of suitable film-forming conditions is as follows: a film-forming temperature of about 100 to 350° C., preferably about 200 to 320° C., particularly preferably near 250° C.; an Ar gas pressure of about 1 to 10 mTorr; and a negative DC bias of about 80 to 400 V. Moreover, other film-forming methods such as vacuum deposition and ion beam sputtering may also be optionally employed in place of sputtering.

In the magnetic recording medium of the present invention, it is particularly preferred that the magnetic recording layer, the precoat layer and the underlayer mentioned above be all formed by sputtering. That is, when all the layers are formed by sputtering, and each of the sputtered layers is adjusted to have a thickness below the predetermined thickness, it becomes possible to obtain the effects of improving the properties of the medium and simplifying the production process.

In addition, the magnetic recording medium of the present invention may optionally and preferably have a protective layer as an uppermost layer on the magnetic recording layer described above, as is frequently adopted in this technical field. Examples of a suitable protective layer are a layer composed of carbon or its compound such as a C layer, a WC layer, a SiC layer, a $B_4C$ layer and a hydrogen-containing C layer, or a diamond-like carbon (DLC) layer. The DLC layer has recently attracted attention because it has a particularly high hardness. In the practice of the present invention, a protective layer composed of carbon or DLC can be particularly advantageously used. Such a protective layer can be formed by a conventional method such as sputtering and vacuum deposition. Although the thickness of the protective layer can vary widely depending upon various factors, it is preferably from about 5 to 15 nm.

Moreover, an amorphous hydrogenated carbon layer (a-C:H layer) or a similar protective layer may be used in place of the protective layers as explained above. For example, Japanese Unexamined Patent Publication (Kokai) No. 5-81660 discloses a protective layer composed of an amorphous hydrogenated carbon layer formed by sputtering. Furthermore, Japanese Unexamined Patent Publication (Kokai) No. 6-349054 discloses that a hydrogen-containing carbon protective layer formed by sputtering is constituted to have an at least two layer structure that comprises a carbon film having a low hydrogen content as a lower layer and a carbon film having a high hydrogen content as an upper layer, in order to improve the CSS resistance and reduce a thickness of the protective layer. In addition, recently, an amorphous hydrogenated carbon layer (PCVD a-C:H layer) formed upon plasma CVD has been suggested to use in place of the sputtered a-C:H layer. For example, Japanese Unexamined Patent Publication (Kokai) No. 7-73454 discloses a method of producing a carbon protective layer in which a $CH_4$ gas, $CF_4$ and others are used as a reactive gas in plasma CVD.

The magnetic recording medium of the present invention may further have additional layers conventionally used in the technical field, in addition to the essential layers and optionally usable layers as explained above; or any of the layers contained may be subjected to optional chemical treatment. For example, a fluorocarbon resin-based lubricating layer may be applied onto the protective layer as mentioned above; or the protective layer may also be subjected to similar treatment.

Furthermore, another aspect of the present invention resides in a magnetic disc apparatus using the magnetic recording medium of the present invention. Although there is no specific limitation on the structure of the magnetic disc apparatus of the present invention, it basically includes an apparatus equipped with a recording head part for recording information on the magnetic recording medium and a reproducing head part for reproducing the information. In particular, the reproducing head part is preferably equipped with a magnetoresistance effect type head in which a magnetoresistance element changes its resistance in accordance with the intensity of a magnetic field such as an MR head is used, as will be explained below.

The composite type magnetic head can preferably be used in the magnetic disc apparatus of the present invention. The composite type magnetic head is formed by laminating a reproducing head part of a magnetoresistance effect type that has a magnetoresistance effect element and a conductor layer supplying a sense current to the magnetoresistance effect element and that reads information in the magnetic recording medium and an induction type recording head part that has a pair of magnetic poles formed from a thin film and that records information in the magnetic recording medium head. The reproducing head of magnetoresistance effect type reproducing head can have various structures known in the technical field. It preferably includes an AMR head utilizing an anisotropic magnetoresistance effect or a GMR head (including a spin bubble type GMR head) utilizing a giant magnetoresistance effect. Although the conductor layer of the reproducing head part may have various constructions, it preferably includes:

(1) a construction in which the conductor layer is relatively thinly formed near the magnetoresistance effect element and thickly formed in the other portions; and (2) a construction in which the conductor layer is relatively thinly and narrowly formed near the magnetoresistance effect element and thickly and widely formed in the other portions.

The thickness of the conductor layer and, if necessary, the width of the conductor layer can be adjusted as explained above by various procedures. However, it is particularly recommended to perform the adjustment by making the conductor layer multilayered to increase the thickness.

In particular, when a magnetic disc apparatus having the construction as explained above is used, the curvature of the magnetic pole of the recording head part can be made small, and the resistance of the conductor layer can be lowered in comparison with a conventional composite type magnetic head; moreover, the information can be accurately read with high sensitivity when the off-track amount falls in a small range.

Figure 6:
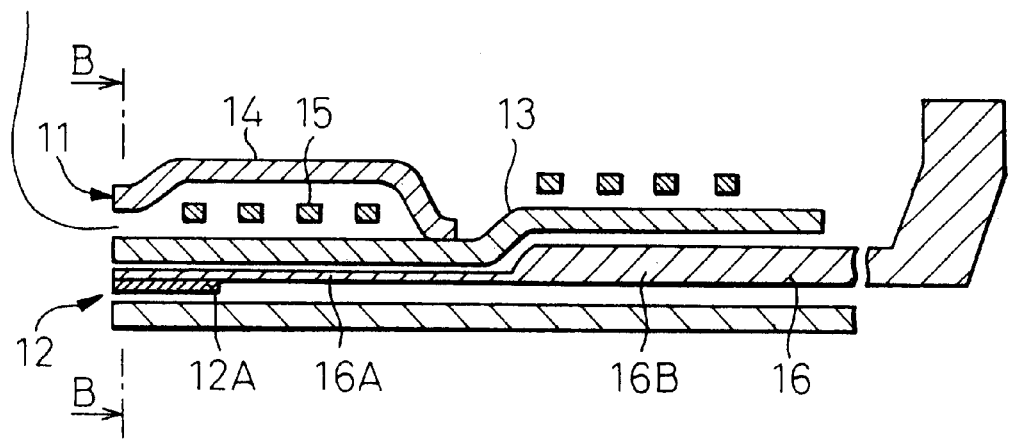
FIG. 6 is a cross-sectional view showing the head of the magnetic disc apparatus of the present invention.
Figure 7:
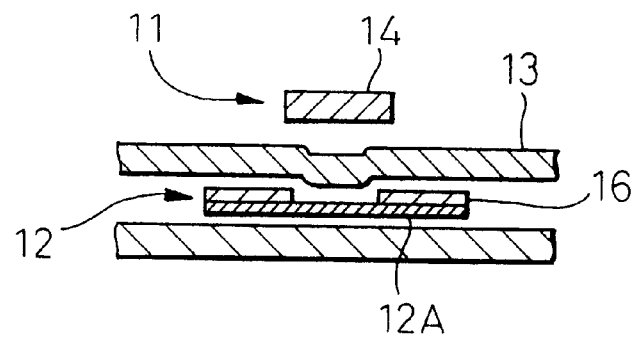
FIG. 7 is a cross-sectional view taken along the line B—B of the magnetic disc apparatus of FIG. 6.

In the magnetic disc apparatus of the present invention, the recording head part and reproducing head part are preferably made to have a laminated structure as shown in FIGS. 6 and 7. FIG. 6 is a principle view of the magnetic disc apparatus of the present invention, and FIG. 7 is a cross-sectional view taken along the line B—B of FIG. 6.

In FIGS. 6 and 7, the reference numeral 11 designates an induction type recording head part that records information on the magnetic recording medium, and the reference numeral 12 designates a reproducing head part of magnetoresistance effect type that reads the information. The recording head part 11 comprises a lower magnetic pole (an upper shield layer) 13 composed of Ni—Fe, etc., an upper magnetic pole 14 composed of Ni—Fe, etc. facing the lower magnetic pole 13 at a given spacing, and a coil 15 that excites the magnetic poles 13 and 14, and that makes the magnetic recording medium record information in the recording gap portions.

The reproducing head part 12 is preferably formed from an AMR head, a GMR head or the like. A pair of conductor layers 16 for supplying a sense current to a magnetoresistance effect element 12A of the head are provided on the element 12A at a spacing corresponding to a recording track width. As to the thickness of the conductor layer 16, the portion 16A near the magnetoresistance effect element part 12A is thinly formed, and the other portion 16B is thickly formed.

In the construction of FIGS. 6 and 7, the thickness of the conductor layer 16 becomes thin in the portion 16A near the magnetoresistance element part 12A. As a result, the curvature of the lower magnetic pole (the upper shield layer) 13 becomes small. The shape of the recording gap facing the magnetic recording medium therefore is not curved much. Consequently, the magnetic disc apparatus can accurately read information even when there is a slight shift of the position of the magnetic head on the track at the time of reading from the magnetic head at the time of recording the information, and the situation that read errors are produced even when the off-track amount is small can be avoided.

On the other hand, since the conductor layer 16 is thickly formed in the portion 16B other than the vicinity of the magnetoresistance effect element part 12A, the entire resistance of the conductor layer 16 can be made small. As a result, a change in the resistance of the magnetoresistance effect element part 12A can be detected with high sensitivity. The S/N ratio is thus improved, and heat generation in the conductor layer 16 can be avoided, thereby preventing production of noise caused by the heat generation.

The magnetoresistance effect type magnetic head can be produced by forming a plurality of magnetic heads on a ceramic head substrate by thin film formation technologies, followed by cutting the head substrate into separate heads. Each of the heads is then processed to have a given shape.

Figure 8:
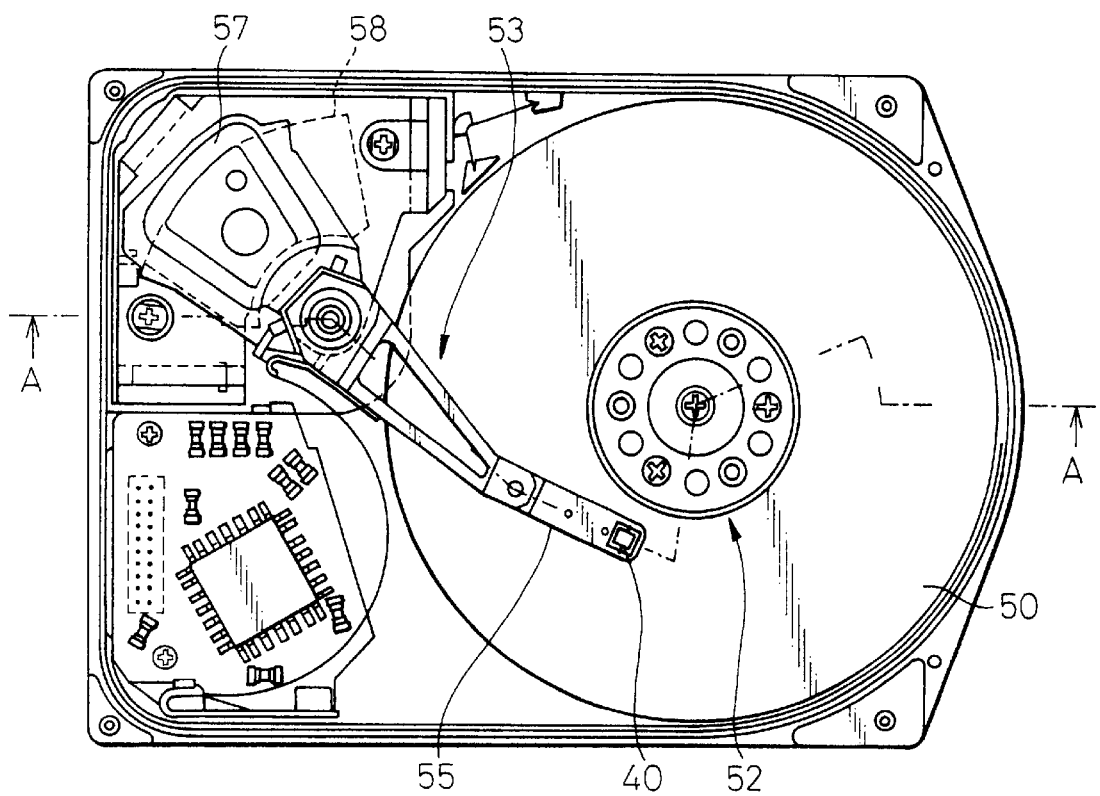
FIG. 8 is a plan view showing one preferred embodiment of the magnetic disc apparatus of the present invention.
Figure 9:
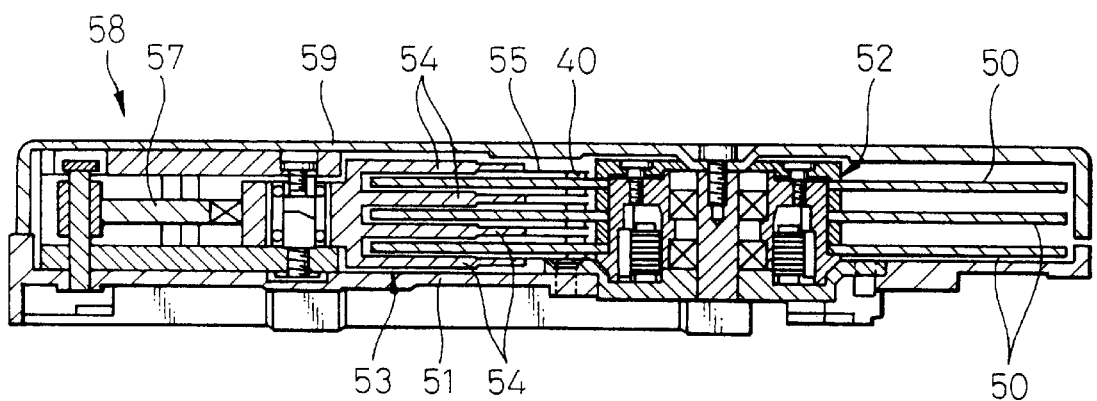
FIG. 9 is a cross-sectional view taken along the line A—A of the magnetic disc apparatus of FIG. 8.

Furthermore, one preferred embodiment of the magnetic disc apparatus according to the present invention is shown in FIGS. 8 and 9. Note that FIG. 8 is a plan view of the magnetic disc apparatus (with the cover removed), and FIG. 9 is a cross-sectional view taken along the line A—A of FIG. 8.

In these figures, the reference numeral 50 designates a plurality of magnetic discs (three discs are illustrated in the drawings), as a magnetic recording medium, rotated by a spindle motor 52 provided on a base plate 51.

The reference numeral 53 designates an actuator rotatably provided on the base plate 51. A plurality of head arms 54 extended in the direction of the recording surface of the magnetic discs 50 are formed in one rotating end portion of the actuator 53. A spring arm 55 is attached to the rotating end portion of the head arms 54, and a slider 40 is tiltably attached to the flexure portion of the spring arm 55 through an insulation layer not shown in the figures. On the other hand, a coil 57 is provided in another rotating end portion of the actuator 53.

A magnetic circuit 58 formed from a magnet and a yoke is provided on the base plate 51, and the coil 57 is arranged in the magnetic gap of the magnetic circuit 58. A moving coil type linear motor (VCM: voice coil motor) is provided with the magnetic circuit 58 and the coil 57. The upper portion of the base plate 51 is covered with a covering 59.

Next, the operation of the magnetic disc apparatus having the above construction will be explained.

When a rotation of the magnetic disc stops, the slider 40 is stopped in contact with a turnout zone of the disc.

When the magnetic disc 50 is rotated at a high speed by the spindle motor 52, the slider 40 is made to fly over the disc surface at a very small height by an air stream generated by the rotation of the magnetic disc 50. When an electric current is applied to the coil 57 while the magnetic apparatus is in the situation explained above, thrust is generated in the coil 57 to rotate the actuator 53. As a result, the head (the slider 40) can be transferred onto a desired track of the magnetic disc 50, and read/write of data can be performed.

Since a conductor layer of a magnetic head is thinly formed near the magnetoresistance effect element part and is thickly formed in the other portion in the magnetic disc apparatus, the curvature of a magnetic pole in the recording head part can be made small and the resistance of the conductor layer can be lowered. Information can thus be read accurately with high sensitivity when the off-track amount falls in a small range.

EXAMPLES

The present invention will be further explained with reference to typical examples thereof. Note that the present invention should not be restricted to the attached examples.

Example 1
Preparation of a Magnetic Recording Medium (a Magnetic Disc)

A magnetic disc having a layer construction shown below was prepared by a procedure explained below.

| | |
|---|---|
| Carbon protective layer | 8 nm |
| $Co_{68}Cr_{20}Pt_{10}Ta_2$ magnetic recording layer | 20 nm |
| $Cr_{90}Mo_{10}$ underlayer | 25 nm |
| recesses-and protrusions-forming $Ni_{81}P_{19}$ layer (texture processing was applied) | 20 nm |
| $Co_{73}Mo_8P_{19}$ reinforcing coat layer | 20 nm |
| Aluminosilicate glass substrate | |

As a nonmagnetic substrate, a disc-like aluminosilicate glass substrate that had a smooth surface (Ra=up to 10 Å), and that was chemically strengthened and well cleaned was provided. A $Co_{73}Mo_8P_{19}$ (at %) reinforcing coat layer was formed at 20 nm thick on the glass substrate by sputtering in a DC magnetron sputtering apparatus. A $Ni_{81}P_{19}$ (at %) recesses-and protrusions-forming layer was further formed at 20 nm thick on the reinforcing coat layer by sputtering. In addition, immediately before sputtering of the above layers, the sputtering chamber was evacuated to have a chamber pressure of up to $5 \times 10^{-8}$ Torr, the substrate was heated with an infrared lamp, and an Ar gas was introduced thereinto to keep the chamber pressure at 5 mTorr. When the Ni—P layer was formed, the substrate was taken out of the sputtering apparatus, and strip-like recesses and protrusions were mechanically formed on the surface of the Ni—P layer in the circumferential direction by texture processing. A diamond slurry (D30000) was used for the texture processing.

When the texture processing was completed, the substrate was again inserted into the sputtering apparatus, and $Cr_{90}Mo_{10}$ (at %) underlayer was formed at 25 nm thick by sputtering. Immediately before sputtering the underlayer, the sputtering chamber was evacuated to have a chamber pressure of up to $5 \times 10^{-8}$ Torr, the substrate was heated with an infrared lamp, and an Ar gas was introduced thereinto to keep the chamber pressure at 5 mTorr, as in the film-forming step explained above, and the film was formed while a bias of −200 V was being applied. Subsequently, a $Co_{68}Cr_{20}Pt_{10}Ta_2$ (at %) magnetic recording layer was further formed at 20 nm thick by sputtering. The film formation was conducted in the same manner as in the formation of the Cr—Mo underlayer except that a Co—Cr—Pt—Ta alloy target was used. Finally, a carbon protective layer was formed at 8 nm thick by sputtering. A magnetic disc (hereinafter termed "a magnetic disc 1") of the present invention having such a layer construction as explained above by referring to FIGS. 3 to 5 was obtained.

Example 2 (Comparative Example)
Preparation of a Comparative Magnetic Recording Medium (a Magnetic Disc)

A comparative magnetic disc having a layer construction explained below was prepared in order to use it for comparison, by repeating the above procedure. In addition, as will be understood below, in the present example, the thickness of the recesses-and protrusions-forming Ni—P layer was increased from 20 nm to 50 nm, and the Co—Mo—P reinforcing coat layer was omitted.

| | |
|---|---|
| Carbon protective layer | 8 nm |
| $Co_{68}Cr_{20}Pt_{10}Ta_2$ magnetic recording layer | 20 nm |
| $Cr_{90}Mo_{10}$ underlayer | 25 nm |
| recesses-and-protrusions-forming $Ni_{81}P_{19}$ layer (texture processing was applied) | 20 nm |
| Aluminosilicate glass substrate | |

A comparative magnetic disc (hereinafter termed "a magnetic disc A") having such a layer construction as explained above by making reference to FIGS. 3 to 5 was obtained.

Example 3
Evaluation of Magnetic Discs

The magnetic disc 1 prepared in Example 1 and the comparative magnetic disc A prepared in Example 2 were evaluated with regard to the properties mentioned below. Note that an EDX was used for analyzing a composition, and a VSM (a vibration sample type magnetometer) was used for measuring magnetism.

(1) Observation of a Medium Surface

Figure 10:
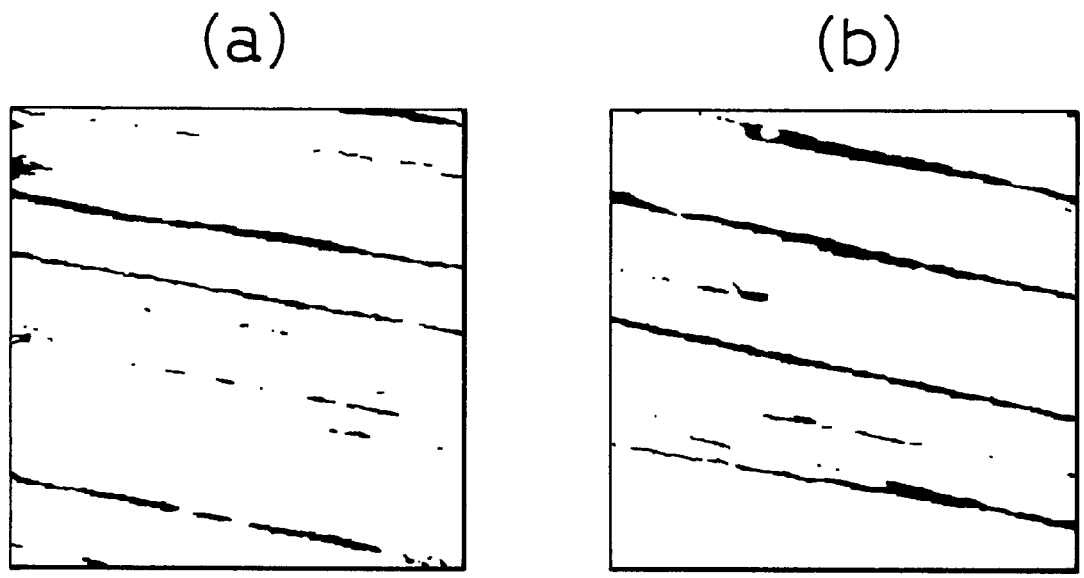
FIG. 10 are drawings showing the results of observing, using AFM, a film surface (a) of the magnetic disc of the invention and a film surface (b) of a comparative magnetic disc.

The surface of each magnetic disc was observed with an AFM (an atomic force microscope) to obtain the results shown in FIG. 10. In FIG. 10, (a) shows the magnetic disc 1 (two layer precoat structure) of the present invention, and (b) shows the comparative magnetic disc A (single layer precoat structure). Black portions in the drawing indicate portions having a depth of at least 4 nm from the average value of recesses and protrusions of the Ni—P layer, and white portions are shallow ones having a depth less than 4 nm. It is understood from comparison of the two drawings (a) and (b) that formation of deep grooves is effectively suppressed in the magnetic disc of the present invention.

Further, although not illustrated, it was found from comparison of bearing curves that, according to the magnetic disc of the present invention, the area of groove portions that are significantly deep is small, that is, formation of deep grooves could be suppressed, in contrast to the comparative magnetic disc.

(2) Comparison between the film hardness of a Ni—P layer and that of a Cr—Mo—P layer The film hardness of the Ni—P layer and that of the Cr—Mo—P layer used on the substrate of the magnetic disc 1 were measured by the following indentation microhardness testing method. Each layer was formed to a thickness of 100 nm on an aluminosilicate glass substrate by sputtering in accordance with the procedure explained in Example 1. The film hardness was then measured with an indentation type thin film hardness meter (Nanoindentor-II, manufactured by Nano Instrument). In the present example, a Berkovich-shaped diamond indentation element (as an indentation head) was pressed into the surface of the layer at an extremely slow speed (0.3 nm/sec) with different stresses, thereby measuring a displacement (nm) of the indentation head each time. Results as plotted in FIG. 11 were obtained. It was found from the results shown in the figure that the Cr—Mo—P layer is more excellent in the film hardness in comparison with the Ni—P layer because the Cr—Mo—P layer requires a larger stress for causing the same displacement than the Ni—P layer.

The following consideration is obtained from examination of the above results. Since there is a difference in the film hardness between the Ni—P layer and the Cr—Mo—P layer, the insertion of the Cr—Mo—P layer (the reinforcing coat layer) can suppress generation of deep grooves, as shown in the schematic view of FIG. 4 previously referred to. That is, when the two layer precoat structure according to the present invention is used, a change in the thickness of the Ni—P layer can adjust the depth of grooves formed in the layer to a desired value. As a result, formation of deep grooves is effectively suppressed and generation of bit errors is inhibited in the magnetic recording medium prepared by the present invention. Furthermore, even when part of the Ni—P layer is peeled to expose the surface of the underlying Cr—Mo—P layer, no deterioration of magnetic properties, read/write performance, and the like, is caused.

(3) Others

The orientation ratio of the medium (a value obtained by dividing a coercive force of the medium in the circumferential direction by a coercive force in the radial direction) in the magnetic disc 1 was 1.3, and the axis of easy magnetization was confirmed to have anisotropic properties in the circumferential direction.

Further, in the comparison of the adhesion of the Ni—P layer to the glass substrate between the magnetic disc 1 and the comparative magnetic disc A, the magnetic disc 1 was confirmed to show a higher adhesion than the magnetic disc A.

INDUSTRIAL APPLICABILITY

As can be understood from the above explanation, the present invention can provide a magnetic recording medium which is excellent in friction sliding characteristics with a flying type magnetic head, which can improve a reproducing output and a S/N ratio while the anisotropy of the axis of easy magnetization in the circumferential direction and the low noise of the magnetic recording medium are kept unchanged, and which inhibits production of bit errors. Moreover, the present invention can provide a magnetic disc apparatus using such a magnetic recording medium.

What is claimed is:

1. A magnetic recording disc comprising a nonmagnetic substrate having applied thereon, through a nonmagnetic underlayer, a magnetic recording layer composed of a magnetic metal material, characterized in that the nonmagnetic substrate comprises a substrate having a surface with an average surface roughness Ra of not more than 20 Å, a sputtered recesses-and protrusions-forming layer having grooves with protrusions and recesses formed on the substrate by mechanical texturing in the circumferential direction, and a reinforcing coat layer having a hardness higher than that of the recesses-and protrusions-forming layer sandwiched between the substrate and the recesses-and protrusions-forming layer, the reinforcing coat layer being composed of a thin film, the reinforcing coat layer being a chromium phosphorous alloy with or without molybdenum as an additional component.

2. The magnetic recording medium according to claim 1, wherein the recesses-and-protrusions-forming layer is a nonmagnetic alloy layer of nickel and phosphorus, and has stripe-like protrusions.

3. The magnetic recording medium according to claim 1 or claim 2, wherein the recesses-and protrusions-forming layer has a thickness of 10 to 30 nm.

4. The magnetic recording medium according to any one of claims 1 or 2, wherein the substrate is one member selected from the group consisting of aluminum, glass, crystallized glass, carbon and silicon.

5. The magnetic recording medium according to any one of claims 1 or 2, wherein the nonmagnetic underlayer is composed of a thin film containing chromium as a major component.

6. The magnetic recording medium according to any one of claims 1 or 2, wherein the magnetic recording layer is formed from a magnetic metal material containing Cr at a concentration of at least 17 at %.

7. The magnetic recording medium according to any one of claims 1 or 2, wherein the magnetic recording layer has tBr, where tBr is the product of the thickness t of the magnetic recording layer and the remnant magnetization density Br, of 30 to 120 G$\mu$m.

8. The magnetic recording medium according to any one of claims 1 or 2, wherein the magnetic recording medium further comprises a protective layer composed of carbon or diamond-like carbon on the magnetic recording layer.

9. The magnetic recording medium according to any one of claims 1 or 2, wherein the magnetic recording medium is used in a magnetic disc apparatus equipped with a flying magnetic head.

10. The magnetic recording medium according to claim 1 or claim 2, wherein the reinforcing coat layer is a sputtered layer.

11. The magnetic recording medium according to claim 10, wherein the reinforcing coat layer has a thickness of 10 to 70 nm.

12. A magnetic disc apparatus equipped with a recording head part for recording information and a reproducing head part for reproducing information in a magnetic recording medium, characterized in that the magnetic recording medium is the one according to any one of claims 1 or 2, and that the reproducing head part is equipped with a magnetoresistance effect head.

13. The magnetic disc apparatus according to claim 12, wherein the magnetoresistance effect head is an MR head, an AMR head or a GMR head.

* * * * *

UNITED STATES PATENT AND TRADEMARK OFFICE
CERTIFICATE OF CORRECTION

PATENT NO.     : 6,509,108 B2
DATED          : January 21, 2003
INVENTOR(S)    : Okuyama et al.

It is certified that error appears in the above-identified patent and that said Letters Patent is hereby corrected as shown below:

Title page,
Item [75], Inventors, change "Yoshita" to -- Yoshito --.

Column 16,
Lines 5-6, delete ", and has stripe-like protrusions"

Signed and Sealed this

Fifth Day of August, 2003

JAMES E. ROGAN
*Director of the United States Patent and Trademark Office*